Nov. 16, 1965   R. W. REICH   3,218,533
OSCILLATOR CONTROLLED ELECTROMAGNETIC DRIVE
Filed Dec. 12, 1960
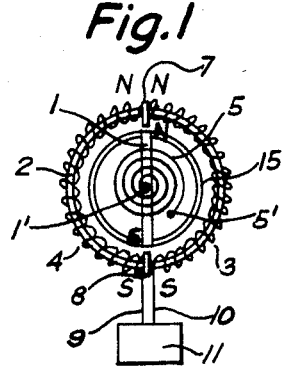
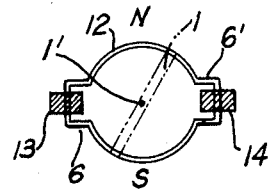
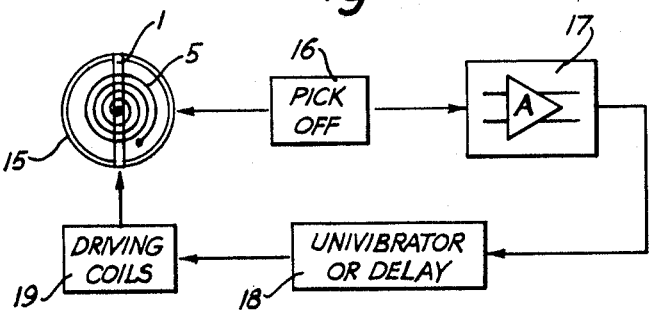
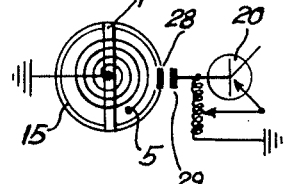
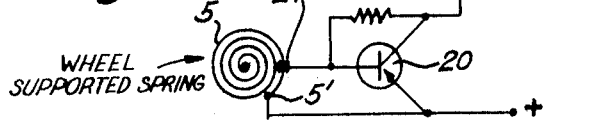
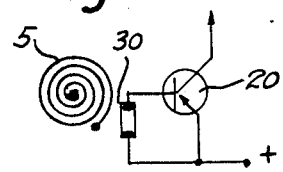
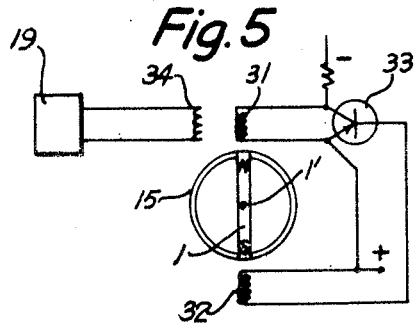
INVENTOR
ROBERT WALTER REICH
BY *Toulmin & Toulmin*
ATTORNEYS

United States Patent Office 3,218,533
Patented Nov. 16, 1965

3,218,533
OSCILLATOR CONTROLLED ELECTROMAGNETIC
DRIVE
Robert Walter Reich, Rotackerstrasse 2, Freiburg im
Breisgau, Germany
Filed Dec. 12, 1960, Ser. No. 75,193
Claims priority, application Germany, Dec. 15, 1959,
R 26,934
1 Claim. (Cl. 318—129)

The present invention relates to a driving system for balance wheels of clocks.

Various types of clock structures are known in the art for driving the balance wheel electrically. The known constructions of this general type can be divided into two classes.

Clocks of one of these classes operate with one or more permanent magnets in the balance wheel. These permanent magnets are disposed along the circumference of the balance wheel whereby the axis of polarization of each permanent magnet is parallel to the axis of the shaft upon which the balance wheel is mounted. The permanent magnets cooperate with coil combinations having no iron core. The other class of clocks having electrically driven balance wheels operates with a soft iron core being positioned and orientated so as to have an axis perpendicular to the axis of the shaft of the balance wheel. In this case, the soft iron core serves as support for the outer ring of the balance wheel. The driving thereof is carried out electromagnetically whereby the mutual distance between the soft iron core and the electrical coil is changed.

Both types of constructions are not suitable for wrist watches for the following reasons: A small balance wheel requires the permanent magnet not to be larger than 1 millimeter at 1 millimeter height. The static and dynamic balancing of such balance wheel is almost impossible in case it carries such necessarily small magnets. Furthermore, the small permanent magnets never can transfer sufficient electromagnetic force to the pickoff coils necessary for example to open a transistor. Even if only used as impelling magnets, without pickoff, such small permanent magnets are still not usable. Even if one combines several permanent magnets and coils to a system nothing is actually improved.

In case one uses a system having a soft iron core and a coil whereby for driving the mutual distance between coil and core is varied, the relationships are even more unfavorable. The balance wheel has to have at least an amplitude of angular deflection of more than 90°. Therefore, the direction of repelling or attracting between core and coil is not uniform and changes to such a considerable degree that no proper force relationship can be established. To remedy this latter situation it has been proposed to use a permanent magnet instead of a soft iron core. However, it has been found, that the permanent magnet will be centered rather than impelled for oscillation.

Therefore, in conclusion, the presently known electromagnetic driving systems for balance wheels in clocks are not suitable for miniaturization.

It is an object of the present invention to provide a new and improved driving system for the balance wheels of clocks.

It is another object of the present invention to provide a new and improved driving system for balance wheels of clocks overcoming the deficiencies outlined above and rendering such driving systems suitable for the miniaturization so that it can be used in small wrist watches.

According to one aspect of the present invention in a preferred embodiment thereof, it is suggested to first define a rotary oscillating system including a balance wheel, a balance spring and a permanent magnet; the permanent magnet thereof is secured to the balance wheel as well as to one end of the balance spring; furthermore there is provided a ring type core of iron having negligible remanence; this core is to be magnetically coupled to the permanent magnet of the rotary oscillating system. Two electrically interconnected coils are disposed on the ring core. These coils are wound so as to produce two similarly orientated magnetic poles in the ring core; the ring core with its coils is positioned with respect to the permanent magnet so that at rest or zero position the poles of the permanent magnet face similar poles when produced electromagnetically in the ring; finally, means are provided to drive current pulses into the coils at a predetermined rate; these pulses may be produced by an oscillator of constant frequency, but there may also be provided a pickoff system sensing the position of rotary oscillating system and converting the thus picked off signal into a train of pulses which are duly amplified and converted into impelling current pulses fed to the coils for producing the poles in the ring core, deflecting the permanent magnet and the balance wheel from resting position. In the latter case there is defined a selfsustained oscillator having an electronic feedback device.

While the specification concludes with the claim particularly pointing out and distinctly claiming the subject matter which is regarded as the invention, it is believed that the invention, the objects of the invention and further objects and advantages thereof will be better understood from the following description taken in connection with accompanying drawing in which:

FIG. 1 is a schematic top view of a structure in accordance with one embodiment of the present invention.

FIG. 2 illustrates a top view of a structure in accordance with another embodiment of the present invention.

FIG. 3 is a circuit diagram or a driving mechanism to be employed together with any of the structures shown in FIG. 1 and FIG. 2.

FIG. 4 illustrates a modified circuit diagram for controlling a balance wheel in a driving mechanism shown in FIG. 1 or FIG. 2.

FIG. 5 illustrates a circuit diagram illustrating another controlling circuit for any of the driving mechanisms illustrated in FIG. 1 and FIG. 2.

FIG. 6 illustrates another circuit diagram for controlling a balance wheel of a clock according to the present invention, and FIG. 7 illustrates a block diagram of a control circuit for a clock driving mechanism according to the present invention.

Turning now to the detailed descriptions of the drawings, particulary FIG. 1 thereof, there is illustrated a rectangularly shaped permanent magnet 1 with poles N, S and having a rotary shaft 1'.

The shaft 1' is suitably supported in a housing structure (not shown) for example by customary jewel bearings. There is further provided a balance spring 5 which is with its inner end secured to the shaft 1' moving, i.e., rotating therewith. The outer end of spring 5 is secured to a stationary pin 5', also in a manner known per se. Thus, upon rotation by oscillation of permanent magnet 1, spring 5 is alternately loaded and/or unloaded.

Permanent magnet 1 supports a balance wheel 15, the diameter of which being equal to the length of the magnet 1.

Concentrically and coaxially to shaft 1' is positioned a stationary ring 2 which may be a ring of circular or of flat rectangular cross section. Ring 2 may even be made of thin wire. As material for ring 2 it is suggested to use iron having a very small i.e. negligible remanence as compared with the remanence of the material of which magnet 1 is made. There are positioned on ring 2 two spacers 7 and 8, made of insulating material and displaced by 180°. Two coils 3 and 4 are mounted on ring 2 in between the spacers. The coils 3 and 4 are electrically interconnected at or adjacent spacer 7, and they have connection lines 9 and 10, respectively, adjacent spacer 8.

Upon manufacturing, the iron ring 2 preferably is first made of two parts, then the coils are placed on each of them and thereafter the ring 2 is welded so as to form a unitary ring structure. The ring 2 defines a magnetically closed conductive circuit, but this is not essential. However, it is essential for the present invention that the coils 2 and 3 are wound so as to produce adjacent magnetic poles when a current flows through them. As shown in the drawing, both coils produce adjacent north poles, at the top of the ring as illustrated, and adjacent south poles at the bottom thereof. If no current flows through the coils no magnetic poles are to be induced in the ring 2 because, as said above the iron is to have only negligible or no remanence.

The balance wheel 15 of the clock is to be made of nonmagnetic material, so as not to influence the magnetic field distribution system as shown. Wheel 15, magnet 1 and spring 5 define a mechanical oscillating system. In the system as illustrated the permanent magnet 1 is shown in its resting position, the spring 5 being not loaded.

The block 11 in which lines 9 and 10 terminate illustrates schematically an electric current source to be explained later. It is sufficient, at the present, to indicate that the current source feeds unidirectional current pulses into the coils 2 and 3.

The device as illustrated in FIG. 1 is suitable for almost any kind of dimensioning. In other words, this structure can be designed so as to fit into a small wrist watch, but can also be used in pocket watches, table clocks, wall clocks and standing clocks. Preferably, the permanent magnet 1 incorporates the primary mass of oscillation. The effective torque is sufficient because magnet 1 is to have a length similar to the diameter of ring 15 as stated above. The oscillating balance wheel thus has permanent magnet 1 as its major component from the standpoint of oscillating inertia. The plane in which ring 2 extends, the plane of rotation of permanent magnet 1 are coinciding or they are parallel planes.

Upon operation, current pulses are produced by the source 11 feeding them into the coils 3 and 4, thereby magnetic poles are produced as illustrated. These magnetic poles are always North poles at the top of the ring 2 and South poles at the bottom of the ring 2 as illustrated. These poles repel the permanent magnet 1 which thus is caused to angularly deflect up to 180° thereby loading the spring. When current pulses in coils 3 and 4 are decayed, the spring forces the permanent magnet 1 back towards its resting position. Another current pulse in coils 3 and 4 again cause deflection of permanent magnet 1 and so forth. Of course, wheel 15 being integral with magnet 1 oscillates therewith.

It is an important feature of the inventive structure as illustrated in FIG. 1 that the magnetic axis of magnet 1 is always substantially positioned in the planes of winding of toroidally shaped coils 3 and 4. Thus, when magnet 1 moves, no counteracting current is induced in coils 3, 4, and therefor practically no weakening of the impelling effect occurs. This fact is evidenced by placing the axis of rotation of magnet 1 perpendicularly to its magnetic axis.

The system as illustrated provides for a driving system of the balance wheel of a clock by means of electromagnetic produced oscillations. It will be apparent that the selected amplitude of deflection of the permanent magnet 1 can be selected, as already said above, up to 180° but, of course, smaller angles are possible. The amplitude in angular deflection depends upon the mass of the rotary system, the resiliency characteristics of spring 5, the pulse sequence or frequency as supplied by source 11, and other data known of mechanical oscillating systems.

It will further be apparent that in this system as shown thus far, the frequency of the oscillation of permanent magnet 1 and balance wheel 15 is determined by the frequency of the pulses produced by source 11. Source 11 can be a transistorized multivibrator or another kind of miniaturized oscillator having a fixed frequency, and having possibly incorporated a constant frequency element such as a quartz oscillator. The current pulses discharged from the source 11 into the coils 3 and 4 are discrete pulses with definite pause intervalls in between. This means that oscillator-pulse source 11 has to be designed so as to produce discrete pulses, the sequence of occurrence being delayed by a certain period of time which is the primary determining factor of the frequency thereof. An ordinary multivibrator having a capacitive or an inductive output circuit provides such pulses as it is known per se, even though the immediate output collector currrents of such multivibrator is defined by rectangularly shaped voltage blocks.

FIG. 2 illustrates a structural modification of the device illustrated in FIG. 1. The permanent magnet 1 is only illustrated by a dashed line; the balance spring is the same, also the same voltage source, as in FIG. 1 and are not shown. The iron ring used for producing effectively oscillating magnetic poles is not a completely circular ring, but the ring 12 as illustrated has two cranked portions 6 and 6' each including a certain straight portion upon which are mounted coils 13 and 14, respectively. In this embodiment, the coils do not surround the entire iron ring, but they are restricted to a small area. The North and South poles are again produced as illustrated by the letters N and S, upon excitation of coils 13 and 14.

It has been found that in this embodiment mutual magnetic coupling between the coils 13 and 14 is reduced without having reduced the magnetic strength of the poles appearing at the upper and lower portion of the ring.

To indicate another modification of this embodiment the permanent magnet 1 is illustrated in FIG. 2 in a different dimensioning as compared with FIG. 1. The permanent magnet 1 is not inserted inside of ring 12 but it is disposed somewhat above or below (of the plane of the drawing), but magnet 1 is very close to ring 12. The length of the permanent magnet 1 matches preferably precisely the diameter of the circular portions of the ring 12. It has been found very suitable for a wrist watch if the length of permanent magnet 1 is about 2 millimeters and the diameter of the circular portion of ring 12 is also 2 millimeters while ring 12 is about half a millimeter thick.

It will be apparent that in the embodiments illustrated above during the movement of the balance wheel and the permanent magnet the energy transfer thereto is carried out completely without any noise because noise, if any, of shaft 1' rotating in its bearings is not audible. This is of a great advantage because the clicking of wrist watches and other watches is sometimes considered annoying.

In view of the fact that an angle of oscillation of the balance wheel of up to 180° can be used it has been found that the entire power supply needed is very low. Miniaturized oscillators incorporated in the source 11 can at the present time be already made of such small dimensions that they easily fit into even a small lady's wrist watch. Also, as a power source very small sized batteries are available at the present time. In particular these electrical circuit elements as just mentioned do not exceed the size and dimension of the driver springs commonly employed in wrist or pocket watches.

Turning now to FIG. 7 there is illustrated a specific example for an oscillator as pulse source 11 and constituting another embodiment of the present invention in which the natural oscillation frequency of the permanent magnet such as 1 together with balance wheel 15 and a balance spring such as 5 i.e. the mechanical oscillating system, determines itself the frequency of oscillation. In other words, in this system no other frequency is superimposed upon the mechanical oscillating system. This particular embodiment operates with an electronic feedback cycle which is to be explained in the following.

There is first provided a pickoff device 16 sensing the particular position of the mechanical oscillating system during rotation thereof. The pickoff device 16 can be of various kinds which will be explained in connection with FIGS. 3, 4, 5 and 6. Specific pickoff elements are 5', 27 (FIG. 3); 28, 29 (FIG. 4); 31, 32 (FIG. 5) and 30 (FIG. 6).

The output of pickoff 16 feeds an amplifier circuit 17 or an impedance matching network or an oscillator producing high frequency oscillations. It will be apparent that the oscillator or amplifier 17 is triggered by pickoff 16 at a rate the frequency of which is precisely the frequency (or an integral multiple thereof) of the mechanical oscillator system 1–5–15. The train of pulses from device 17 are fed to a circuit network 18 which may be a monostable multivibrator, but which can also be a pulse delay line. The output of circuit network 18 is a train of current pulses of the same frequency as the trigger pulses coming from pickoff 16 but having a phase shift with respect thereto. The network 17 and 18 may be exchanged in their connection. The delayed and amplified pulses are fed to driver coils 19 which correspond to the coils 3 and 4 in FIG. 1 or 13 and 14 in FIG. 2 to deflect the permanent magnet 1 and balance wheel 15.

Upon operation, the oscillation of system 1–5–15 produces signals sensed by pickoff 16, amplified in network 17 and eventually used therein to trigger high frequency oscillations, the output of network 17 is shaped by network 18; the output of network 18 are current driver pulses impelling the oscillating system 1–5–15. It is apparent that this is a complete, self-sustaining feed-back oscillator with electronic feedback. The delay device 18 may be omitted entirely in case the sensing or pickoff device 16 is energized just at the time when the impelling pulse is needed.

Certain pickoff devices are illustrated, as stated above, in FIG. 3 to FIG. 6. Turning particularly to FIG. 3, there is illustrated a capacitor type pickoff. The balance spring 5 serves as an adjuster in a capacitor 27 which is the position sensing element corresponding to pickoff 16 in FIG. 7. This capacitor 27 is connected in the base-emitter circuit of a transistor 20 having resistively interconnected collector and base electrodes. Upon an alteration in the capacitance 27, a train of damped high frequency pulses is produced defining together a current pulse which then is fed to a delay line corresponding to the delay line 18 of FIG. 7 and to driver coils 19 as of FIG. 7 which as already said above, correspond to the coils 3 and 4 in FIG. 1 or 14 and 15 in FIG. 2. The current pulse in driver coils 19 thus is a series or train of high frequency pulses, each series or train occurring at the rate of the oscillator frequency of the mechanical system including spring 5.

It will be apparent that these trains are produced at the rate of the natural frequency of the mechanical system.

FIG. 4 illustrates another mode of pickoff in which not the balance spring but the balance wheel 15 is used as the element the position of which is being sensed. There the capacitor 28 having one plate is incorporated in the balance wheel 15, while the other plate denoted with reference number 29, is stationarily positioned and electrically connected to the transistor 20. Upon oscillation the capacitance is materially altered thus changing materially the base current for transistor 20. The output of transistor 20 is utilized in a manner similar as outlined above with reference to FIG. 3.

FIG. 5 illustrates another embodiment for the pickoff device having incorporated an oscillating structure. There are provided two coils 31 and 32 which are inductively coupled by the permanent magnet 1 being secured to the balance wheel 15. The coil 31 is connected across the emitter-collector path of a transistor 33, while the coil 32 is a part of the emitter-base circuit thereof. This circuit also defines a transistor oscillator which includes as coupling element permanent magnet 1 stimulating oscillations. The oscillations are picked up by a coil 34 and fed to driver coils 19. It is apparent that the transistor oscillator oscillates at a high frequency whenever coils 31 and 32 are coupled. If this is the case when magnet 1 is at its resting position as illustrated in FIG. 1, no delay is needed because the impelling pulses occur right at that moment.

The particular magnetic coupling as illustrated in FIG. 6, or the altered capacitive couplings of FIG. 3 and FIG. 4, set up bursts of high frequency oscillations. These bursts occur at the rate of the relatively low frequency with which the wheel 15 and magnet 1 oscillate. In other words, the high frequency oscillations are produced in groups occurring at a frequency relatively low as compared with the oscillations themselves whereby the low frequency is the natural oscillating frequency of the permanent magnet, the wheel and the spring as a combined mechanical oscillating system. In this case each of the impelling pulses are in fact produced by a plurality of high frequency current pulses.

FIG. 6 illustrates another embodiment in which a photodiode 30 senses the position of the balance spring 5. This type of pickoff is preferably used in stationarily positioned clocks wherein a suitable permanent light source can be used to basically illuminate the diode 30 while the spring 5, or, alternatively, the balance wheel, or the permanent magnet are serving as variable diaphragm changing the illumination for diode 30 at a frequency corresponding to the natural frequency of the oscillations of the oscillating system of the watch.

The invention is not limited to the embodiments described above but all changes and modifications thereof not constituting departments from the spirit and scope of the invention are intended to be covered by the following claim:

I claim:

A driving system for balance wheels of clocks comprising: a balance wheel; a rotatable permanent magnet secured to said balance wheel; a stationary iron ring of negligible remanence coaxially positioned to said wheel and said magnet; two electrically interconnected coils disposed on said ring and being magnetically displaced from each other by substantially 180° so as to produce similar magnetic poles at adjacent locations on said ring; a balance spring secured with one of its ends to said permanent magnet tending to place said magnet so as to face locations of said ring where are produced similar poles; pickoff means sensing the position of said balance spring; means electrically connected to said pickoff means producing pulses at a rate the frequency of which corresponding to the oscillations frequency of said wheel; means for delaying said pulses; and means for feeding current pulses through said coils corresponding to said delayed pickoff pulses, said current pulses serving to produce said magnetic poles in said ring thereby impelling said magnet and said wheel.

References Cited by the Examiner

UNITED STATES PATENTS

| 2,895,095 | 7/1959 | Guyton | 318—127 |
| 2,961,587 | 11/1960 | Aeshmann | 318—132 |

MILTON O. HIRSHFIELD, *Primary Examiner.*

ORIS L. RADER, *Examiner.*